(12) United States Patent
Mudalige et al.

(10) Patent No.: US 9,099,006 B2
(45) Date of Patent: Aug. 4, 2015

(54) CONTEXT-AWARE THREAT RESPONSE ARBITRATION

(71) Applicant: GM GLOBAL TECHNOLOGY OPERATIONS LLC, Detroit, MI (US)

(72) Inventors: Upali Priyantha Mudalige, Oakland Township, MI (US); Michael Losh, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 27 days.

(21) Appl. No.: 13/973,736

(22) Filed: Aug. 22, 2013

(65) Prior Publication Data

US 2015/0057891 A1 Feb. 26, 2015

(51) Int. Cl.
*G08G 1/16* (2006.01)
*B60W 10/00* (2006.01)
*B60W 10/20* (2006.01)
*B60W 10/18* (2012.01)

(52) U.S. Cl.
CPC .............. *G08G 1/166* (2013.01); *B60W 10/00* (2013.01); *B60W 10/18* (2013.01); *B60W 10/20* (2013.01); *B60W 2510/0604* (2013.01); *B60W 2510/18* (2013.01); *B60W 2510/20* (2013.01)

(58) Field of Classification Search
CPC ..... B60W 10/00; B60W 10/18; B60W 10/20; B60W 2510/18; B60W 2510/20; B60W 2510/0604
USPC .......................................... 701/42, 36, 41, 48
See application file for complete search history.

(56) References Cited

U.S. PATENT DOCUMENTS

| 7,300,381 | B2 * | 11/2007 | Badillo et al. ................. 477/102 |
| 8,170,751 | B2 | 5/2012 | Lee |
| 8,190,330 | B2 | 5/2012 | Lee |
| 8,494,718 | B2 * | 7/2013 | Muth et al. ....................... 701/42 |

(Continued)

FOREIGN PATENT DOCUMENTS

| DE | 10-2007-002-197 A1 | 7/2008 |
| DE | 10 2007 046 688 A1 | 4/2009 |
| DE | 10 2011 009 374 A1 | 8/2011 |

OTHER PUBLICATIONS

Chenming Zhao, Weidong Xiang, Richardson, P., "Vehicle Lateral Control and Yaw Stability Control through Differential Braking," vol. 1, Publication Year: 2006 , pp. 384-389.*

*Primary Examiner* — Tuan C. To
(74) *Attorney, Agent, or Firm* — John A. Miller; Miller IP Group, PLC

(57) ABSTRACT

A method for prioritizing potential threats identified by vehicle active safety systems. The method includes providing context information including map information, vehicle position information, traffic assessment information, road condition information, weather condition information, and vehicle state information. The method calculates a system context value for each active safety system using the context information. Each active safety system provides a system threat level value, a system braking value, a system steering value, and a system throttle value. The method calculates an overall threat level value using all of the system context values and all of the system threat level values. The method then provides a braking request value to vehicle brakes based on all of the system braking values, a throttle request value to a vehicle throttle based on all of the system throttle values, and a steering request value to vehicle steering based on all of the system steering values.

20 Claims, 3 Drawing Sheets

(56) References Cited

U.S. PATENT DOCUMENTS

| | | | |
|---|---|---|---|
| 8,512,208 B2* | 8/2013 | Hilberer | 477/199 |
| 8,600,614 B2* | 12/2013 | Filev et al. | 701/36 |
| 8,655,565 B2* | 2/2014 | Dagenais et al. | 701/70 |
| 8,864,247 B2* | 10/2014 | Hilberer | 303/122.15 |
| 2010/0030428 A1* | 2/2010 | Gartner | 701/42 |
| 2010/0241314 A1* | 9/2010 | Bohm et al. | 701/41 |
| 2011/0035111 A1* | 2/2011 | Dagenais et al. | 701/42 |
| 2011/0193693 A1* | 8/2011 | Filev et al. | 340/435 |
| 2011/0204716 A1* | 8/2011 | Abe et al. | 307/10.8 |
| 2012/0072067 A1* | 3/2012 | Jecker et al. | 701/25 |
| 2012/0203399 A1* | 8/2012 | Filev et al. | 701/1 |
| 2012/0203424 A1* | 8/2012 | Filev et al. | 701/36 |
| 2012/0283907 A1* | 11/2012 | Lee et al. | 701/31.9 |
| 2014/0039776 A1* | 2/2014 | Cowgill | 701/102 |
| 2014/0097030 A1* | 4/2014 | Rolfe et al. | 180/55 |
| 2014/0222272 A1* | 8/2014 | Raste et al. | 701/22 |
| 2014/0343813 A1* | 11/2014 | Morselli et al. | 701/70 |
| 2015/0033054 A1* | 1/2015 | Armbruster et al. | 713/323 |

* cited by examiner

CONTEXT-AWARE THREAT RESPONSE ARBITRATION

BACKGROUND OF THE INVENTION

1. Field of the Invention

This invention relates generally to a system and method for prioritizing potential threats identified by a plurality of vehicle active safety systems and, more particularly, to a system and method for prioritizing potential threats identified by a plurality of vehicle active safety systems that uses context information, such as local map, traffic, weather and vehicle state data.

2. Discussion of the Related Art

The operation of modern vehicles is becoming more autonomous, i.e., vehicles are able to provide driving control with less driver intervention. Cruise control systems have been on vehicles for a number of years where the vehicle operator can set a particular speed of the vehicle, and the vehicle will maintain that speed without the driver operating the throttle. Adaptive cruise control systems have been recently developed where not only does the system maintain the set speed, but also will automatically slow the vehicle down in the event that a slower moving vehicle is detected in front of the subject vehicle using various sensors, such as radar, LiDAR and cameras. Modern vehicle control systems may also include autonomous parking where the vehicle will automatically provide the steering control for parking the vehicle, and where the control system will intervene if the driver makes harsh steering changes that may affect vehicle stability and lane centering capabilities, where the vehicle system attempts to maintain the vehicle near the center of the lane. Fully autonomous vehicles have been demonstrated that drive in simulated urban traffic up to 30 mph.

As vehicle systems improve, they will become more autonomous with the goal being a completely autonomously driven vehicle. Future vehicles will likely employ autonomous systems for lane changing, passing, turns away from traffic, turns into traffic, etc. U.S. Pat. No. 8,190,330, issued May 29, 2012, titled "Model Based Predictive Control for Automated Lane Centering/Changing Control Systems," assigned to the assignee of this application and herein incorporated by reference, discloses a system and method for providing steering angle control for lane centering and lane changing purposes in an autonomous or semi-autonomous vehicle. U.S. Pat. No. 8,170,751, issued May 1, 2012, titled "Detection of Driver Intervention During a Torque Overlay Operation in an Electric Power Steering System," assigned to the assignee of this application and herein incorporated by reference, discloses a system and method for controlling vehicle steering by detecting a driver intervention in a torque overly operation.

Modern vehicles sometimes include a collision avoidance system that employs object detection sensors that enable collision warning or avoidance and other active safety applications. The object detection sensors may use any of a number of technologies, such as short range radar, long range radar, cameras with image processing, laser or LiDAR, ultrasound, etc. The object detection sensors detect vehicles and other objects in the path of a host vehicle, and the application software uses the object detection information to provide warnings or take actions as appropriate.

Other active safety systems have been implemented on vehicles, or are currently envisioned to be implemented on vehicles, such as stopped vehicle ahead (SVA) systems, forward collision avoidance (FCA) systems, pedestrian detection (PD) systems, rear cross traffic avoidance (RCTA) systems, collision imminent steering (CIS) systems, left turn across path (LTAP) systems, later collision prevention (LCP) systems, straight crossing path (SCP) systems, etc. These various active safety systems typically operate independently of each other, and periodically calculate threat-levels to warn the vehicle operator and/or control vehicle actuators (steering/braking/throttle) for the particular application. The known active safety systems are statically prioritized in that the operation of one particular safety system may take precedent over the operation of another active safety system as an initially calibrated control without concern for the particular driving situation of the vehicle. Because of these priorities, only one of the warning and/or control features for a particular active safety system is presented to the vehicle operator.

Because of the number of potential available active safety systems and the limits on prioritizing the response to potential threats identified by those systems, it is desirable to improve the prioritizing of the responses based on the current driving situation on the vehicle. For example, future vehicle active safety systems will include prioritized control for vehicles navigating an intersection that could include multiple driving situations. These various active safety systems may be properly prioritized when a vehicle is navigating an intersection, but would not suitably apply for other driving situations, such as a vehicle traveling in a parking lot.

SUMMARY OF THE INVENTION

In accordance with the teachings of the present invention, a system and method are disclosed for prioritizing potential threats identified by a plurality of vehicle active safety systems. The method includes providing context information including map information, vehicle position information, traffic assessment information, road condition information, weather condition information, and vehicle state information. The method calculates a system context value for each active safety system using the context information. Each active safety system provides a system threat level value, a system braking value, a system steering value, and a system throttle value. The method calculates an overall threat level value using all of the system context values and all of the system threat level values. The method then provides a braking request value to vehicle brakes based on all of the system braking values, a throttle request value to a vehicle throttle based on all of the system throttle values, and a steering request value to vehicle steering based on all of the system steering values.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for prioritizing potential threats identified by a plurality of vehicle active safety systems is merely exemplary in nature, and is in no way intended to limit the invention or its applications or uses.

Figure 1:
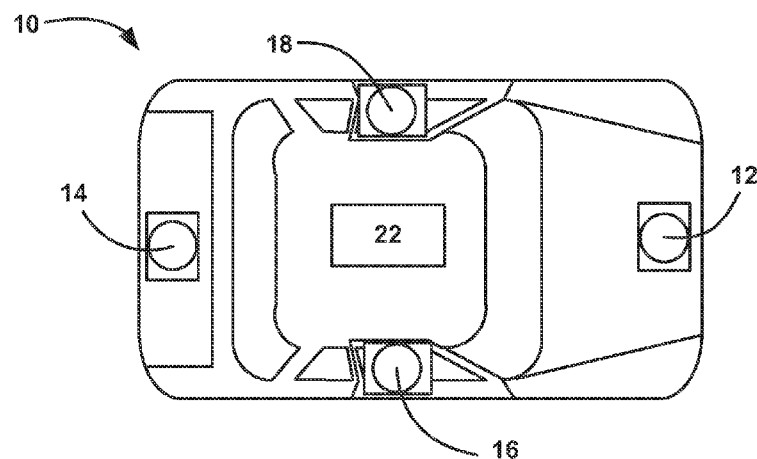
FIG. 1 is an illustration of a vehicle including multiple sensors.

FIG. 1 is an illustration of a vehicle 10 including a front-view sensor 12, a rear-view sensor 14, a right-side view sensor 16 and a left-side view sensor 18. The sensors 12-18 are intended to represent any sensor applicable for vehicle active safety systems or other systems including radar sensors, LiDAR sensors, cameras, etc., and suitable for the purposes described herein, many of which are known in the automotive art. The sensors 12-18 can be mounted within or on any suitable structure that is part of the vehicle 10, such as bumpers, facia, grill, side-view mirrors, door panels, etc., as would be well understood and appreciated by those skilled in the art. Sensor data from the sensors 12-18 is provided to a processing system 22 that processes the data to provide active safety functions. The vehicle 10 may include a number of active safety systems including, but not limited to, systems for collision imminent steering (CIS), lateral collision prevention (LCP), pedestrian detection (PD), straight crossing path (SCP), left turn across path (LTAP), rear cross traffic avoidance (RCTA) and forward collision avoidance (FCA). The system 22 is intended to represent any and/or all of the devices, circuits, processors, actuators, software, etc. necessary to process sensor data and provide the signals and operations as discussed herein.

As will be discussed in detail below, the present invention proposes a system and method for providing threat arbitration and response for a plurality of vehicle active safety systems based on real-time local driving context information obtained from navigation maps, traffic information, weather information, vehicle states, road condition information, etc. The system and method employ an algorithm for determining real-time threat arbitration and for prioritizing features based on local driving context. The algorithm uses dynamically arbitrated responses to alert or warn drivers, and control vehicle actuators for crash avoidance and autonomous driving functions. The algorithm adapts to threat levels and future priority in real-time to determine the best course of response using local driving context information, and determines the best actuation response and/or driver alert or warning. The algorithm fuses and prioritizes the threat levels from individual features to provide a natural response spectrum, and improve safety and convenience by reducing inappropriate vehicle responses.

The system and method of the invention provide a number of advantages including intelligently adapting to threat levels for multiple features and feature priority in real-time to determine a best course of action in response to crash avoidance situations. The invention improves safety and convenience by reducing the probability of inappropriate vehicle response actuation for crash avoidance in autonomous vehicles. The invention eliminates potential driver confusion caused by multiple warning modalities originated from individual features within the same predetermined priority.

Figure 2:
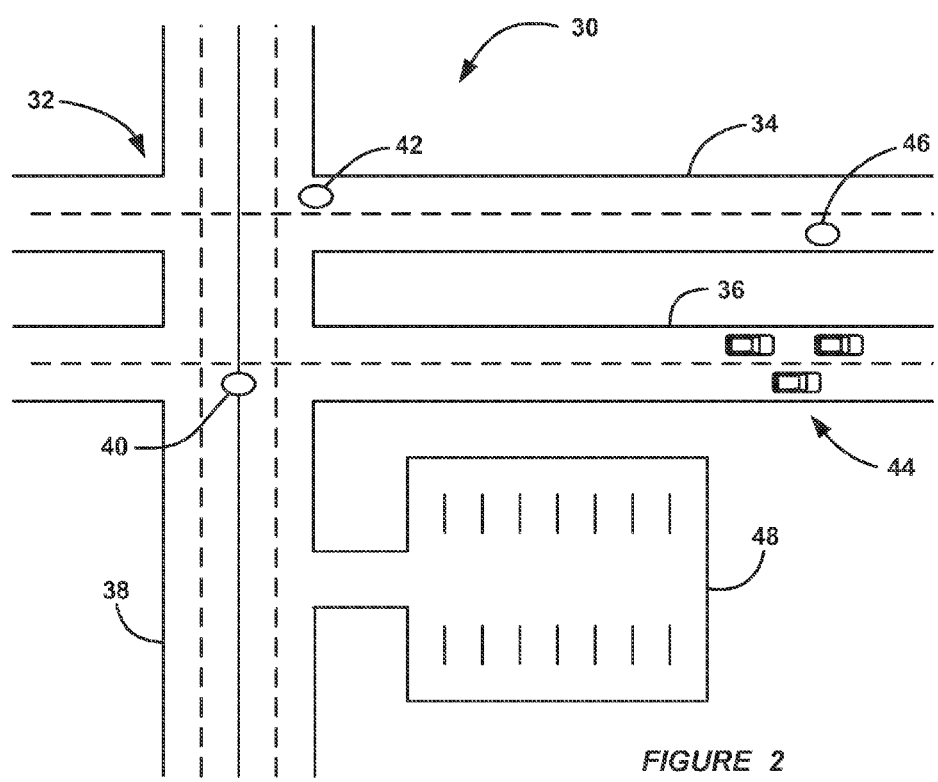
FIG. 2 is an illustration of various potential driving situations.

FIG. 2 is an illustration of a roadway system 30 including an intersection 32 defined by separate east/west travel lanes 34 and 36 and a north/south travel lane 38. A vehicle traveling in the roadway system 30 may encounter a number of different traffic situations and scenarios causing various and different levels of threats. For example, in the illustration for the roadway system 30, location 40 is identified for a vehicle turning left, location 42 is identified for a pedestrian zone, location 44 is identified as a congested driving location, location 46 is identified as an open highway location and location 48 is a parking lot.

As mentioned, the present invention uses local maps, traffic conditions, weather data, road data, vehicle state sub-systems, etc. to continuously provide driving context information to a threat response arbitration algorithm that analyzes the information to select among various arbitration strategies or sets of threat response weighting factors to prioritize which of the various active safety systems take priority for different situations. The threat response arbitration algorithm will prevent inappropriate response actuation and provide a more natural response spectrum. The context categories may also be accompanied by context parameters that provide additional details about the current driving situation. For example, at the left-turn location 40 the arbitration algorithm may promote the LTAP system and demote the SCP system. Further, at the pedestrian zone location 42, the arbitration algorithm may promote the PD system and demote the ROTA system. Also, at the intersection 32, the threat arbitration algorithm may promote the FCA, LTAP and SCP systems, and demote the CIS and ROTA systems. At the congestion location 44, the arbitration algorithm may promote the LCP and FCA systems, and demote the ROTA system. At the open road location 46, the arbitration algorithm may promote the LCP and CIS systems and demote the ROTA and SCP systems. In the parking lot 48, the arbitration algorithm may promote the ROTA and FCA systems, and demote the LCP and CIS systems.

Figure 3:
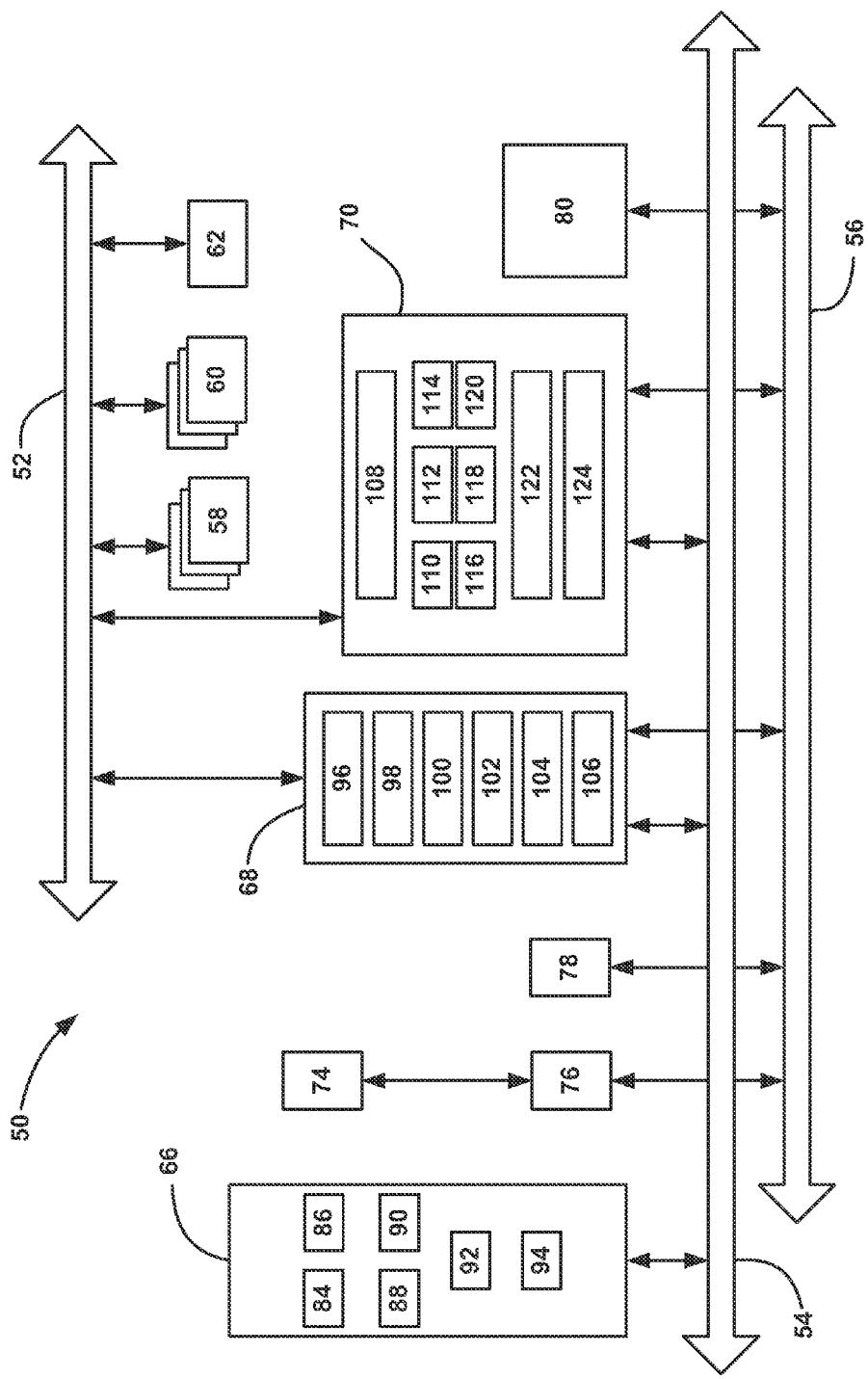
FIG. 3 is a schematic block diagram of a vehicle active safety system architecture.

FIG. 3 is a schematic block diagram of a vehicle system architecture 50 for the vehicle 10 where the arbitration threat algorithm referred to above is part of the architecture 50 and is provided in an arbitration threat module discussed in detail below. The architecture 50 includes an object sensor local area network (LAN) and/or controller area network (CAN) bus 52, a vehicle CAN bus 54 and a safety and control LAN bus 56. The busses 52, 54 and 56 receive and carry signals consistent with the discussion herein and in a manner well understood by those skilled in the art. Vehicle LiDAR sensors are represented by boxes 58, vehicle radar sensors are represented by boxes 60 and a vehicle vision or camera system is represented by box 62, all of which are in communication with the bus 52. The architecture 50 includes production vehicle systems 66, a perception and coordination processor 68 and a vehicle control and feature processor 70, where the production vehicle systems are in communication with the bus 54 and the perception and coordination processor 68 and the vehicle control and feature processor 70 are in communication with the busses 54 and 56, all of which are also well understood by those skilled in the art. The architecture 50 also includes a GPS receiver 74 in communication with a vehicle communications system 76, which is in communication with the safety and control LAN bus 56. The communications system 76 may include any number of vehicle communications applications, such as vehicle-to-vehicle and vehicle-to-infrastructure, referred generally as V2X systems. These types of systems are often dedicated short range communications (DSRC) systems that allow a vehicle to transmit messages to other vehicles in a particular area with warning messages about dangerous road conditions, driving events, accidents, etc. The architecture 50 also includes a map database 78 that downloads and stores map information for different and various locations, where the map database 78 is in communication with the bus 56. A navigation human machine interface (HMI) and data logger 80 is also shown in communication with the bus 56.

The production vehicle systems 66 include a number of modules, systems and sub-systems provided for a specific vehicle. Those modules and sub-systems may include a body control module (BCM) 84, a powertrain control module (PCM) 86, an electronic brake control module (ECBM) 88, an adaptive cruise control (ACC) sub-system 90, an electric power steering (EPS) sub-system 92 and a navigation system 94. The processor 68 would include a number of algorithms and sub-systems for providing perception and coordination features including perception input 96, central sensor fusion 98, external object state 100, host state 102, situation awareness 104 and localization and maps 106. The vehicle control and feature processor 70 includes an arbitration module 122 that performs the priority analysis for the active safety systems as discussed herein. The processor 70 also includes algorithms for sensor fusion at box 108 for fusing the sensor data from the LiDAR sensors 58, the radar sensors 60 and the vision system 62. The processor 70 also includes the various active safety systems discussed herein including an electronic stability control (ESC) system 110, a CIS system 112, an LTAP system 114, an ROTA system 116, a PD system 118 and an LCP system 120. Other active safety systems also could be provided in the processor 70. The processor 70 also includes an actuation module 124 that provides signals for braking control, steering control and throttle control as received from the arbitration module 122.

Figure 4:
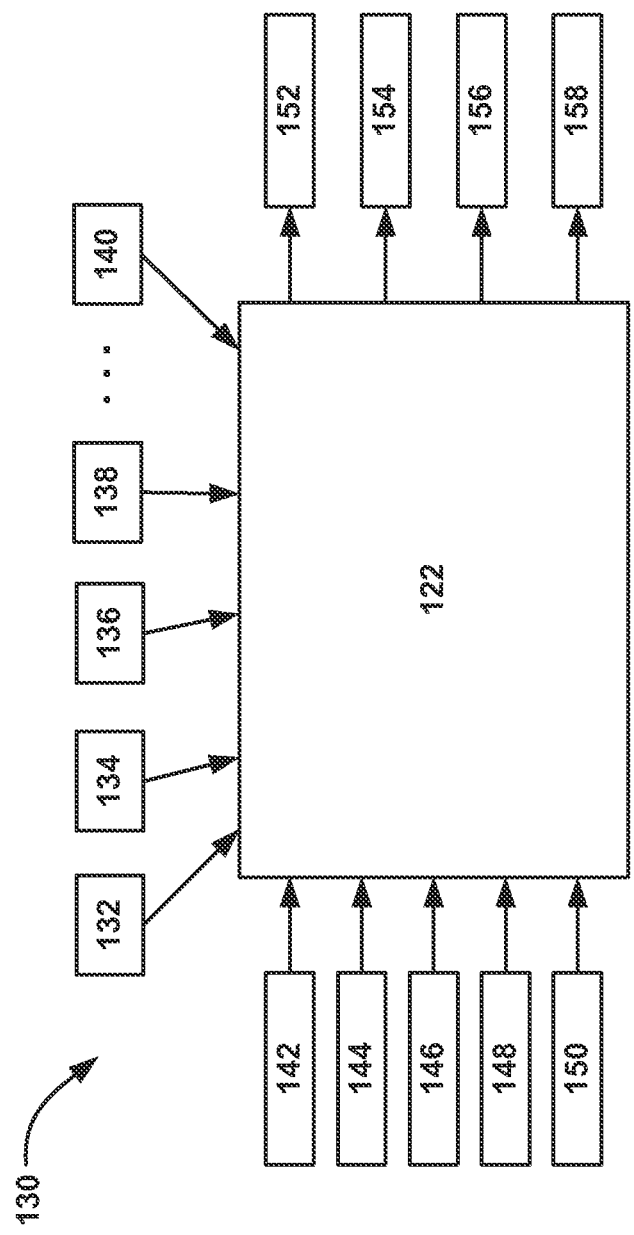
FIG. 4 is a block diagram of a context-aware threat response arbitration module shown in the architecture of FIG. 3.

FIG. 4 is a block diagram of a context-aware threat response arbitration system 130 including the arbitration module 122. The system 130 shows that the arbitration module 122 receives input signals from the various active safety systems including an LTAP system 132, an SCP system 134, a CIS system 136, a PD system 138 and an ROTA system 140. Further, the system 130 shows that the arbitration module 122 receives context information from the available sources including map information at box 142, vehicle GPS position estimation at box 144, traffic congestion assessment information at box 146, road and weather conditions at box 148 and vehicle state information, such as speed, gear, yaw rate, etc., at box 150. The system 130 also shows that the arbitration module 122 provides outputs to a human machine interface (HMI) module 152 to provide warnings or displays, to vehicle brakes 154 for automatic vehicle braking, to a vehicle throttle 156 for automatic vehicle speed adjustments, and to a vehicle steering 158 for automatic vehicle steering adjustments.

The arbitration module 122 processes the information provided from the various active safety systems 132-140 and the context information provided by the map information 142, the vehicle position 144, the traffic assessment 146, the road and weather conditions 148 and the vehicle states 150 to calculate an overall threat level value T that is provided to the HMI module 152, an automatic braking request value B that is provided to the brakes 154, an automatic throttle request value H that is provided to the throttle 156, and an automatic steering request value S that is provided to the steering 158. It is noted that each of the values T, B, H and S are normalized between 0 and 1. Each of the active safety systems 132-140 provides its own threat level value T, braking request value B, throttle request value H and steering request value S to the arbitration module 122, where each value T, B, H and S identified herein for a particular active safety system 132-140 is designated with a subscript identifying that safety system.

The arbitration module 122 calculates a separate context value C for each of the active safety systems 132-140, where the separate context value C identified herein for a particular active safety system 132-140 is designated with a subscript identifying that safety system. Each separate context value C for the active safety systems 132-140 may be a different value for that safety system as determined by weighting factors assigned to that system. In other words, each separate piece of context information is assigned a predetermined number of weighting factors that define that particular context information, and each active safety system may have a different assigned value for a particular weighting factor depending on what that safety system is intended to protect. In one embodiment, each of the weighting factors is normalized between 0 and 1. Examples of weighting factors for map information $M_1$-$M_m$, traffic information $T_1$-$T_t$ and weather/road information $W_1$-$W_w$ can be: $M_1$ is for intersection going straight, $M_2$ is for intersection turning left, $M_3$ is for intersection turning right, $M_4$ is for freeway/highway, $M_5$ is for urban road, curved or straight, $M_6$ is for neighborhood/school zone, and $M_7$ is for parking location; $T_1$ is for dense traffic, $T_2$ is for medium traffic, and $T_3$ is for light traffic; and $W_1$ is for dry asphalt, $W_2$ is for dry unpaved roadway, $W_3$ is for snow/wet asphalt, $W_4$ is for snow/wet unpaved roadway, $W_5$ is for slippery road, and $W_6$ is for slope or hill. It is stressed that these are non-limiting examples in that each piece of context information C can include any suitable number of weighting factors, and any specifically defined weighting factors. Further, the other pieces of context information not specifically defined would also include predefined weighting factors.

The individual context value C for each of the active safety systems 132-140 is calculated by adding the normalized weighting factors for each piece of context information, and then adding the added weighting factors to get the context value C for that active safety system. Equations (1) and (2) below show examples for determining the context value C for the LTAP system and the CIS system, respectively.

$$C_{LTAP} = \Sigma_{xi}{}^{xj} M_{rm} + \Sigma_{xi}{}^{xj} T_{rt} + \Sigma_{xi}{}^{xj} W_{rw} + \qquad (1)$$

$$C_{CIS} = \Sigma_{yi}{}^{yj} M_{rm} + \Sigma_{yi}{}^{yj} T_{rt} + \Sigma_{wi}{}^{wj} W_{rw} + \qquad (2)$$

The arbitration module 122 calculates the overall threat value T by multiplying the context value C for the particular active safety system and the threat level value T for that safety system, and adding all of the values together as shown by equation (3) below.

$$T = C_{LTAP} \cdot T_{LTAP} + C_{SCP} \cdot T_{SCP} + C_{CIS} \cdot T_{CIS} + \ldots + C_{RCTA} \cdot T_{RCTA} \qquad (3)$$

The arbitration module 122 determines the value T, the value B, the value H and the value S to be output to the HMI module 152, the brakes 154, the throttle 156, and the steering 158, respectively, using any suitable calculation. In one non-limiting example, the value T is provided by equation (3) above, the value B is the maximum braking request provided from all of the B values from the active safety systems 132-140, the value H is the minimum throttle request provided from all of the H values from the active safety systems 132-140, and the value S is a function of the threat level value T and the S values from all of the active safety systems 132-140 as shown in equations (4)-(7) below.

$$T = t(T_{LTAP}, T_{SCP}, T_{CIS}, \ldots, T_{RCTA}, \ldots) \qquad (4)$$

$$B = b(T) \max(B_{LTAP}, B_{SCP}, B_{CIS}, \ldots, B_{RCTA}, \ldots) \qquad (5)$$

$$H = h(T) \min(H_{LTAP}, H_{SCP}, H_{CIS}, \ldots, H_{RCTA}, \ldots) \qquad (6)$$

$$S = s(T, S_{LTAP}, S_{SCP}, S_{CIS}, \ldots, S_{RCTA}, \ldots) \qquad (7)$$

Equations (4)-(7) are rewritten below with suitable numerical values to calculate the T, B, H and S values depending on the local information. For example, if the vehicle is at an intersection on a snowy day, and on a dedicated left turning lane with pedestrian crossing, the parameters to calculate $C_{LTAP}$ can be selected as:

$$M_1, M_3, M_4, M_5, M_6, M_7 = 0 \qquad (8)$$

$$M_2 = 1.0 \qquad (9)$$

$$T_1, T_2, T_3 = 0.0 \quad (10)$$

$$W_1, W_2, W_6 = 0 \quad (11)$$

$$W_3, W_4, W_5 = 0.1 \quad (12)$$

$$C_{LTAP} = 1.3 \quad (13)$$

Similarly, $C_{PD}=1.3$ and $C_{LTAP}=2.5$ when there are pedestrian crossings. For this scenario, the other parameters have the values:

$$C_{SCP}, C_{CIS}, C_{RTC-A}, \ldots = 0.0 \quad (14)$$

If there is no dedicated left turning lane, $C_{SCP}$ is non-zero and assumes a value similar to $C_{LTAP}$ in this case. Accordingly, equation (4) calculates the threat (T) as:

$$T = (1.3 * T_{LTAP} + 1.3 * T_{PD})/2 \quad (15)$$

for dedicated left turn lane case and:

$$T = (1.3 * T_{LTAP} + 1.3 * T_{PD} + 1.3 * T_{SCP})/3 \quad (16)$$

for a non-dedicated left turning case.

The values B and H use the maximum and minimum functions, respectively, to calculate the brake and throttle request values. The steering request S is zero in this scenario because $C_{CIS}=0$.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for prioritizing a vehicle response for a plurality of active safety systems on the vehicle, said method comprising:
    providing context information, including information from sensors which detect objects and conditions surrounding the vehicle;
    calculating a system context value for each active safety system using the context information;
    providing a system threat level value, a system braking value, a system steering value and a system throttle value from each of the active safety systems;
    calculating an overall threat level value using all of the system context values and all of the system threat level values;
    providing a braking request value to vehicle brakes based on all of the system braking values;
    providing a throttle request value to a vehicle throttle based on all of the system throttle values; and
    providing a steering request value to vehicle steering based on all of the system steering values.

2. The method according to claim 1 wherein providing context information includes providing map information, vehicle position information, traffic assessment information, road condition information, weather condition information and vehicle state information.

3. The method according to claim 2 wherein providing vehicle state information includes providing vehicle speed, vehicle yaw rate and vehicle gear selection.

4. The method according to claim 2 wherein calculating a system context value for each active safety system includes using a plurality of weighting factors for each piece of context information.

5. The method according to claim 4 wherein calculating a system context value for each active safety system includes adding normalized weighting factors for each piece of context information and then adding all of the normalized and added weighting factors.

6. The method according to claim 1 wherein calculating an overall threat level value includes multiplying the system context value and the system threat level value for each active safety system and adding the multiplied system context values and system threat level values.

7. The method according to claim 1 wherein the vehicle active safety systems include a collision imminent steering system, a lateral collision prevention system, a pedestrian detection system, a straight crossing path system, a left turn across path system, a rear cross traffic avoidance system and a collision avoidance system.

8. The method according to claim 1 wherein providing a braking request value includes providing the maximum system braking value from all of the active safety systems.

9. The method according to claim 1 wherein providing a throttle request value includes providing the minimum system throttle value from all of the active safety systems.

10. The method according to claim 1 further comprising providing the overall threat level value to a human machine interface module to provide a warning.

11. A method for prioritizing a vehicle response for a plurality of active safety systems on the vehicle, said method comprising:
    providing context information including map information, vehicle position information, traffic assessment information, road condition information, weather condition information, and vehicle state information, where providing context information includes providing information from sensors which detect objects and conditions surrounding the vehicle;
    calculating a system context value for each active safety system using the context information including using a plurality of weighting factors for each piece of context information;
    providing a system threat level value from each of the active safety systems;
    calculating an overall threat level value using all of the system context values and all of the system threat level values; and
    providing one or more of vehicle braking, vehicle throttle and vehicle steering based on the overall threat level value.

12. The method according to claim 11 wherein providing vehicle state information includes providing vehicle speed, vehicle yaw rate and vehicle gear selection.

13. The method according to claim 11 wherein calculating a system context value for each active safety system includes adding normalized weighting factors for each piece of context information and then adding all of the normalized and added weighting factors.

14. The method according to claim 11 wherein calculating an overall threat level value includes multiplying the system context value and the system threat level value for each active safety system and adding the multiplied system context values and system threat level values.

15. The method according to claim 11 wherein the vehicle active safety systems include a collision imminent steering system, a lateral collision prevention system, a pedestrian detection system, a straight crossing path system, a left turn across path system, a rear cross traffic avoidance system and a collision avoidance system.

16. The method according to claim 11 further comprising providing the overall threat level value to a human machine interface module to provide a warning.

17. An apparatus method for prioritizing a vehicle response for a plurality of active safety systems on the vehicle, said apparatus comprising:
- means for providing context information, including sensors which detect objects and conditions surrounding the vehicle;
- means for calculating a system context value for each active safety system using the context information;
- means for providing a system threat level value, a system braking value, a system steering value and a system throttle value from each of the active safety systems;
- means for calculating an overall threat level value using all of the system context values and all of the system threat level values;
- means for providing a braking request value to vehicle brakes based on all of the system braking values;
- means for providing a throttle request value to a vehicle throttle based on all of the system throttle values; and
- means for providing a steering request value to vehicle steering based on all of the system steering values.

18. The apparatus according to claim 17 wherein the means for providing context information provides map information, vehicle position information, traffic assessment information, road condition information, weather condition information and vehicle state information.

19. The apparatus according to claim 18 wherein the means for calculating a system context value for each active safety system uses a plurality of weighting factors for each piece of context information.

20. The apparatus according to claim 17 wherein the means for calculating an overall threat level value multiplies the system context value and the system threat level value for each active safety system and adding the multiplied system context values and system threat level values.

* * * * *